Patented Apr. 1, 1930

1,752,946

UNITED STATES PATENT OFFICE

WALTER W. EVANS, OF LONGMEADOW, MASSACHUSETTS, ASSIGNOR TO R. T. VANDERBILT COMPANY, INCORPORATED, OF NEW YORK, N. Y., A CORPORATION OF NEW YORK

OIL COMPOSITION, ETC.

No Drawing. Original application filed September 23, 1927, Serial No. 221,623. Divided and this application filed December 26, 1928. Serial No. 328,623.

This invention relates to improvements in oil and grease compositions and to a treatment of mineral oils and greases to give compositions of greater stability than ordinary oils and greases.

This case is a division of my prior application Serial No. 221,623, filed September 23, 1927.

According to the present invention, there is added to and compounded with a mineral oil or grease composition a small amount of an alkylenediaryldiamine, for example ethylenediphenyldiamine. The addition of a small amount of such a product materially improves the ageing properties of the composition and retards deterioration thereof at high temperatures, while under the influence of an electrical current or when exposed to the action of the air, especially at high temperatures. When mineral oil lubricants, for example, are used in internal combustion engines, the high temperature to which the oils are subjected results in more or less rapid deterioration with loss of lubricating properties, particularly where air comes in contact with the oils at the same time that they are subjected to heat and the oils undergo more or less decomposition with the attendant formation of carbon or sludge-like ingredients. The addition of a small amount of an alkylenediaryldiamine to such a lubricating oil tends to stabilize oil and retard deterioration.

In the case of transformer oils, the addition of a small amount of an alkylene diaryl diamine increases the period of usefulness of the oil and prevents or retards its deterioration. By preventing or retarding the deterioration, the oil may be used over a greater period of time and the expense of frequent replacement, etc., is eliminated. The saving in oil is appreciable and there is a further saving incident to the use of a good grade of oil rather than a partially decomposed oil.

Oils used for saturating cable wrappings are kept at high temperature over a long period of time in a saturating bath, during saturation of the wrapping, which produces deterioration, and further deterioration results from the electrical stresses set up when the cable is in use. The addition of a small amount of an alkylene diaryl diamine stabilizes the saturating oil, giving it longer life and increasing its efficiency as an insulator.

The stabilizing agents which are added in small amounts to oil or grease compositions, according to my invention, are alkylenediaryldiamines. The alkylene diaryl diamines can be obtained by the condensation of alkylene dihalides such as ethylene dichloride with aromatic amines such as aniline, etc. Other alkylene halides containing more than two carbon atoms in the alkylene group can be condensed with aniline or with other aromatic amines, while ethylene dichloride can also be condensed with other aromatic amines besides aniline, for example, toluidine, naphthylamine, etc.

The alkylenediaryldiamine is employed in oil compositions in small amounts usually less than one percent, for example from 0.2 to 0.5%, although the amount can be increased or decreased.

For example, 0.5% of ethylene-di-para-tolyl-diamine is gradually added to a refined mineral oil of specific gravity of 0.915 such as is used for insulating cable wrappings of high voltage cables. The oil is heated and is stirred sufficiently to insure uniform solution of the amine in the oil. The treated oil has improved properties as a saturant for cable wrappings.

The action of the alkylenediaryldiamines as stabilizing agents is somewhat obscure but apparently their value lies in the fact that they retard oxidation at elevated temperatures or under electrical conditions to which oil or grease compositions may be subjected in use and particularly where air or oxygen comes into contact with the oil or grease composition.

I claim:

1. A mineral oil or grease composition comprising hydrocarbon oils or greases and a fraction of a per cent of an alkylenediaryldiamine.

2. A hydrocarbon composition of mineral origin and a small amount of an alkylenediaryldiamine admixed therewith.

3. A mineral oil or grease which is intended for use under conditions tending to accelerate deterioration which contains an alkylenediaryldiamine to resist such deterioration.

4. A mineral oil or grease and a fraction of a per cent of ethylenediphenyldiamine admixed therewith.

In testimony whereof I affix my signature.

WALTER W. EVANS.